United States Patent [19]

Spada

[11] 4,266,198
[45] May 5, 1981

[54] SAMPLING SYSTEM FOR DECODING BIPHASE-CODED DATA MESSAGES

[75] Inventor: Bernardino Spada, Corbetta, Italy

[73] Assignee: Societa Italiana Telecomunicazioni Siemens S.p.A., Milan, Italy

[21] Appl. No.: 73,301

[22] Filed: Sep. 7, 1979

[30] Foreign Application Priority Data

Sep. 8, 1978 [IT] Italy .................. 27455 A/78

[51] Int. Cl.³ ............................................. H03D 3/18
[52] U.S. Cl. .................................. 329/50; 329/103; 329/107; 375/87
[58] Field of Search ............... 329/107, 104, 50, 102, 329/110, 106, 107, 122, 123; 375/87, 118, 119

[56] References Cited

U.S. PATENT DOCUMENTS

| | | | |
|---|---|---|---|
| 3,654,564 | 4/1972 | Tisi | 329/122 |
| 3,982,195 | 9/1976 | Turner | 329/50 |
| 4,029,905 | 6/1977 | Abraham | 375/120 |

*Primary Examiner*—David K. Moore
*Attorney, Agent, or Firm*—Karl F. Ross

[57] ABSTRACT

A receiving station of a data-transmission system, designed to decode an incoming pulse train in the shape of a differentially biphase-coded carrier wave whose cycles represent respective message bits, includes a phase detector responsive to a presynchronization oscillation preceding an incoming message. The presynchronization signal, in the form of a square wave of half the frequency of the carrier wave, is fed to a phase detector along with a locally generated square wave of carrier-wave frequency. The phase detector, comprising several cascaded flip-flops, determines the relative time position of the local square wave and the presynchronization oscillation with the aid of an Exclusive-OR gate in the input of the first flip-flop and emits a corrective signal shifting the local square wave by half a cycle whenever the leading edges of the latter wave do not coincide with the beginnings of half-cycles of the presynchronization oscillation.

3 Claims, 4 Drawing Figures

SAMPLING SYSTEM FOR DECODING BIPHASE-CODED DATA MESSAGES

FIELD OF THE INVENTION

My present invention relates to a system for decoding, at a receiving station, an incoming pulse train in the shape of a biphase-coded carrier wave whose cycles represent respective bits of a binary message transmitted in base band.

BACKGROUND OF THE INVENTION

A particular carrier wave of the differentially biphase-coded type, e.g. one conforming to the well-known Manchester code or the split-phase code, is characterized in that its phase is reversed at the beginning of every cycle in which the transmitted message signal has the logical value "1" whereas the phase remains unchanged when that logical value is "0". With a slightly different code, described in commonly owned U.S. patent application Ser. No. 970,417 filed Dec. 18, 1978 by Ezio Cottatellucci and now U.S. Pat. No. 4,213,891, such a 180° phase shift occurs only upon a change of the basic signal from "0" to "1" or vice versa.

The decoding of such a biphase-coded carrier wave can be performed, for example, by algebraically combining the squared or clipped wave with a replica thereof shifted by half a cycle to produce a ternary wave and sampling the latter midway in every other half-cycle of the original wave. The sampling operation can be timed with the aid of correlation pulses or spikes derived by differentiation from the incoming carrier wave, these spikes occurring invariably in the middle of each cycle while also appearing at irregular intervals—depending upon the logical values of the message bits—at the beginning of a new cycle. The correct sampling times can be determined from the recurrent pattern of the spikes.

As pointed out in another commonly owned U.S. patent application, Ser. No. 61,480 filed July 27, 1979 by Riccardo Caldarella et al, an alternate decoding technique yields correct results with sampling in either the first or the second half of a carrier-wave cycle, except for the fact that distortion experienced by the wave during transmission may make sampling in one half-cycle less error-prone in the presence of phase jitter and therefore more desirable than in the other half-cycle. Thus, it is generally necessary to distinguish between "right" and "wrong" half-cycles for sampling purposes, i.e. to select one of two possible trains of sampling pulses which can be derived from the incoming carrier wave by differentiation.

The solutions to these problems described in the above-identified commonly owned applications, whose disclosures are hereby incorporated by reference into the present application, call for the use of phase detectors designed to shift the sampling pulses by half their recurrence period upon detecting their alignment with the "wrong" half-cycles. Such a switchover, however, can be carried out only after a certain delay during which the phasing of the sampling pulses is determined. In systems where a delay of more than a few milliseconds would be inadmissible during message decoding, therefore, it has already been proposed to let the actual message transmission follow an acquisition interval in which a presynchronization oscillation of half the frequency of the unmodulated carrier wave is sent out. This oscillation, appearing as a square wave after the usual clipping to which the modulated carrier wave is subsequently also subjected, is the equivalent of that carrier wave continuously modulated by a binary "1" under the aforementioned split-pulse code, for example.

OBJECTS OF THE INVENTION

The general object of my present invention is to provide simple and reliable circuitry for determining, during the acquisition interval referred to above, the correct timing of a train of sampling pulses generated for decoding a subsequently arriving message.

A more particular object is to provide means in such circuitry for preventing an untimely switchover in response to spurious signals.

SUMMARY OF THE INVENTION

In accordance with my present invention, circuitry for controlling a decoder designed to sample a biphase-coded carrier wave, preceded by a presynchronization oscillation of the type described, comprises differentiation means connected to the decoder input for deriving a spike from that oscillation at the beginning of each half-cycle thereof, timing means controlled by the differentiation means for producing a local square wave of the same frequency as the carrier wave (i.e. double the frequency of the presynchronization oscillation) undergoing a phase reversal at the beginning and at the midpoint of each half-cycle, switching means connected to the decoder input and to the timing means for deriving from the local square wave a reference square wave having the same frequency as the presynchronization oscillation while being offset therefrom by an odd number of quarter-cycles of the carrier frequency, phase-comparison means coupled to the switching means for identifying the half-cycles of the presynchronization oscillation coinciding with leading edges of the reference square wave, and feedback means extending from the phase-comparison means to the timing means for inverting the phases of the local square wave and of the related reference square wave upon detection of a coincidence of these leading edges with predetermined half-cycles of the presynchronization oscillation. By way of delay means inserted between the timing means and the decoder, the latter receives the local square wave with a lag equal to a quarter-cycle of the carrier wave or to an odd multiple of such quarter-cycles.

Pursuant to a more particular feature of my invention, the reference square wave and an inverted replica thereof appear at respective outputs of the switching means and are fed, together with the local square wave, to respective comparison circuits forming part of the phase-comparison means. These comparison circuits work into a coincidence (AND, NAND or NOR) gate which emits a phase-inverting signal only upon detecting coincidences of the aforementioned predetermined half-cycles (e.g. those of logical value "1") with leading edges of both the reference square wave and its inverted replica, thereby preventing an untimely phase inversion upon the occurrence of spurious signal pulses.

BRIEF DESCRIPTION OF THE DRAWING

The above and other features of my invention will now be described in detail with reference to the accompanying drawing in which.

SPECIFIC DESCRIPTION

Figure 1:
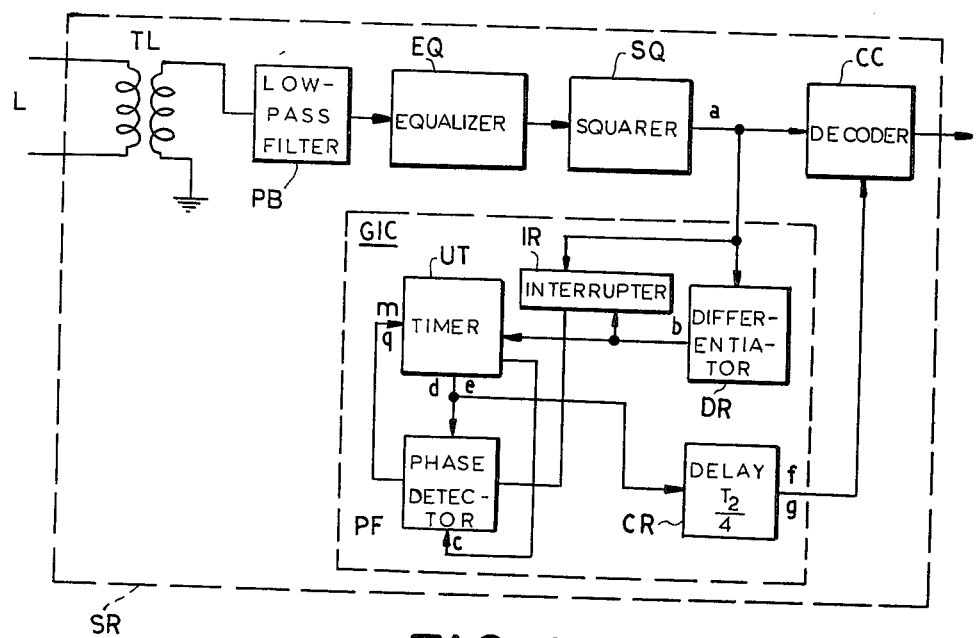
FIG. 1 is a block diagram of a receiver for biphase-coded carrier waves, preceded by presynchronization oscillations, which includes sampling-controlling circuitry according to my invention.

The receiving station SR shown in FIG. 1 comprises a transformer TL with a primary winding connected across a transmission line L and a secondary winding which feeds a biphase-coded carrier wave, arriving from a remote station, via a low-pass filter PB and an equalizer EQ to a squarer SQ. The latter clips not only the incoming carrier wave, having a frequency $F_1 = 1/T_2$ in its unmodulated state, but also a presynchronization oscillation of frequency $F_2 = \frac{1}{2}T_2$ received during a preceding acquisition interval; this oscillation, on issuing from circuit SQ, is a square wave a as shown in the first graph of FIG. 4. A decoder CC is connected to the output of squarer SQ.

As explained in commonly owned application Ser. No. 61,480 referred to above, the length of a pulse of the modulated carrier wave immediately preceding a cycle constituting a bit "1" is doubled whereby a subharmonic $F_2 = \frac{1}{2}T_2$, equal to the frequency of the presynchronization oscillation, is effectively superimposed upon the fundamental wave frequency $F_1$. This has been schematically illustrated in FIG. 3 which represents an eye diagram of the incoming wave as viewed on an oscilloscope connected to the receiver upstream of squarer SQ. It will be noted that larger eyes $E_2$ of length $T_2$, representing the subharmonic $F_2$, encompass pairs of smaller eyes $E_1'$, $E_1''$ whose length more or less equals $T_1 = T_2/2$, representing the fundamental $F_1$.

Figure 3:
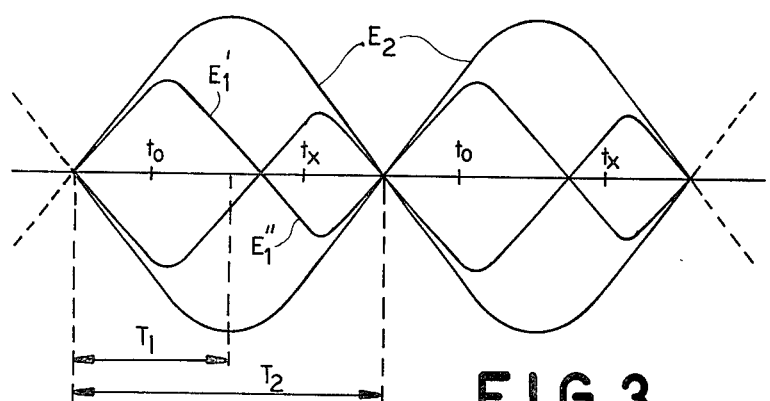
FIG. 3 shows an eye diagram of an incoming carrier wave to be decoded.

The eyes $E_1'$, $E_1''$ shown in FIG. 3 are often found to be of unequal length owing to a distortion along line L, which tends to attenuate higher frequencies more than lower ones, such distortion being usually compensated only imperfectly by the equalizer EQ of opposite attenuation characteristic, especially where the latter is of the nonadaptive type. The relative eye size, therefore, may differ according to whether the wave is monitored upstream or downstream of the equalizer. Even if the decoder CC is so designed that correct samples could be obtained at the center $t_0$ or $t_x$ of either half-cycle of frequency $F_1$, and if the eye of a particular half-cycle (e.g. the first one in the illustrated example) is inevitably larger than that of the other half-cycle, on account of distortion phenomena, a system according to my invention can also be used for insuring that sampling always takes place in the half-cycle with the larger eye in order to reduce the error rate.

In the following description it will be assumed that, for whatever reason, the sampling pulses generated in decoder CC are to occur at times $t_0$ midway of the first half-cycle, i.e. within eye $E_1'$.

Figure 4:
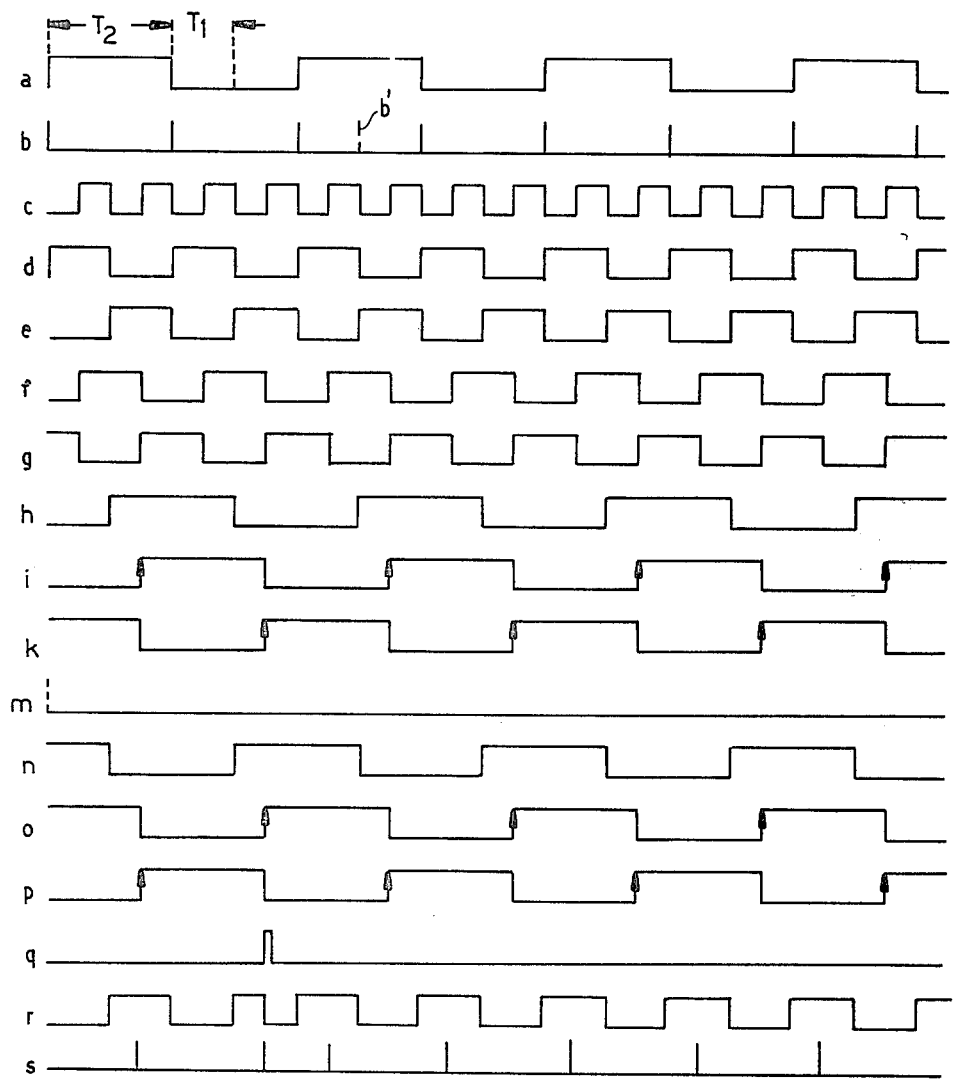
FIG. 4 is a set of graphs relating to the operation of the phase detector shown in FIG. 2.

The signals issuing from squarer SQ are also fed to a differentiator DR deriving therefrom, during the acquisition interval, a succession of spikes b coinciding with the beginning of each half-cycle of length $T_2$ as shown in the second graph of FIG. 4. Circuit DR forms part of a sampling-pulse generator GIC further including a timing unit UT synchronized by the spikes b, a phase detector RF receiving from unit UT an ancillary square wave c of frequency $1/T_1$ and either of two square waves d, e of carrier frequency $F_1$ as shown in the next three graphs of FIG. 4, and a delay circuit CR receiving the latter square waves from unit UT in order to shift them by a time $T_2/4$ (corresponding to a quarter-cycle of frequency $F_1$ or an eighth of a cycle of frequency $F_2$) to emit to decoder CC a square wave f or g as illustrated in the sixth and seventh graphs of FIG. 4. Timing unit UT may comprise a phase-locked oscillator, driven by the spikes b, as disclosed in application Ser. No. 61,480; the locally generated square waves c and d (or e) are respectively obtained from that oscillator and from a frequency halver connected thereto. During message reception following the acquisition interval, spikes b will also occur in intermediate time positions as indicated at b' in FIG. 4; this, however, will have no effect upon the phase-locked local oscillator of unit UT operating at twice the carrier frequency $F_1$.

Even though the ancillary square wave c is directly obtained from the phase-locked oscillator so that its own phase does not vary with reference to that of the presynchronization oscillation a, this will not unequivocally determine the phasing of the divider stage emitting a wave of half that frequency so that the latter may have either the shape d or the shape e. In dependence upon that shape, the phase detector RF feeds back either a consent signal m or a corrective signal q as illustrated in the correspondingly designated graphs of FIG. 4. Signal q is a single pulse which, being generated at the beginning of the third quarter of a half-cycle of oscillation a as will be described hereinafter, acts as an additional switching pulse for the flip-flop serving as the frequency halver so as to replace the "wrong" square wave e by the "right" square wave d. The latter wave, after undergoing a 90° phase shift in delay circuit CR, appears in the input of decoder CC as the wave f whose leading edges coincide with the instants $t_0$ of FIG. 3 and are thus properly timed for the sampling of the subsequently arriving modulated carrier wave.

Figure 2:
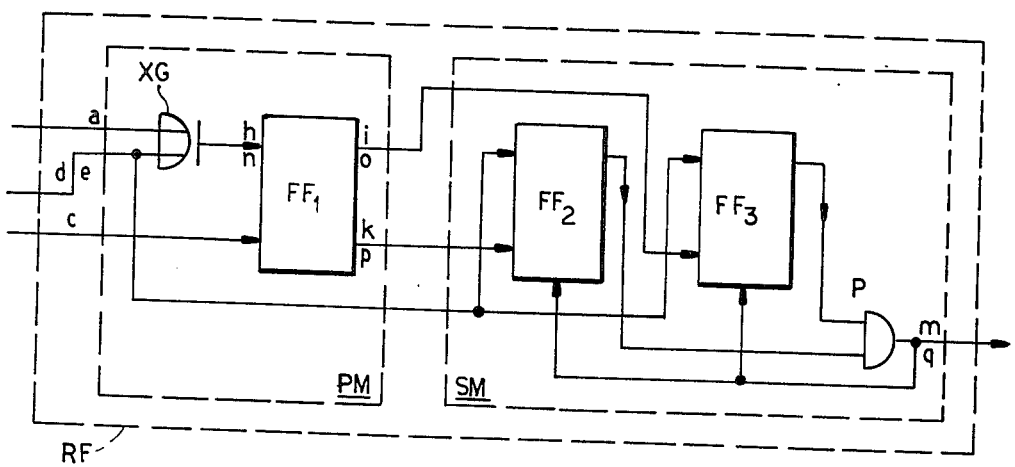
FIG. 2 is a more detailed diagram of a phase detector forming part of that circuitry.

I shall now describe the operation of the phase detector RF with reference to FIG. 2 showing same to comprise a switching stage PM and a comparison stage SM. Switching stage PM includes an Exclusive-OR gate XG whose inputs receive the presynchronization oscillation a from squarer SQ and the local square wave d (or e) from timing unit UT of FIG. 1. The XOR gate XG emits a square wave h, of the same frequency as oscillation a but offset therefrom by a period $T_1$, in the presence of local wave d; if, instead, its complement e appears at an input of gate XG, an inversion n of wave h is generated. Wave h or n, illustrated in homonymous graphs of FIG. 4, is fed to a data input of a flip-flop $FF_1$ whose switching input receives the ancillary wave c from unit UT, responding to its rising edges. Thus, the set output of flip-flop $FF_1$ carries a reference wave i, similar to wave h but lagging same by another quarter-cycle $T_1/2$ of the carrier wave, as long as gate XG receives the wave h; the reset output of this flip-flop then carries an inverted replica k of reference wave i. If, however, the signal on the second input of gate XG is a local wave e, reference waves o and p offset from waves i and k by 180° will appear in their stead. As will be apparent from the correspondingly designated graphs of FIG. 4, the leading edges of waves i and p follow those of oscillation a by a time $3T_2/4$ while those of waves k and o appear a half-cycle $T_2$ later.

Thus, the leading edges of reference wave i and its replica k invariably coincide with the low-voltage half-cycles of the concurrently present local wave d whereas those of waves o and p occur on the high-voltage half-cycles of the local wave e giving rise thereto.

The reset output of data-type flip-flop $FF_1$ is connected to the switching input of a similar flip-flop $FF_2$ while its set output is connected to a corresponding input of a further data-type flip-flop $FF_3$ in comparison stage SM, these two latter flip-flops having data inputs both connected to the output of timing unit UT carrying local square wave d or e. If waves d, i and k are present, neither of these two flip-flops will be set; an AND gate P connected to their set outputs will therefore be nonconductive so as to emit the zero-level consent signal m to unit UT (FIG. 1). If, however, waves e, o and p have come into existence, flip-flops $FF_2$ and $FF_3$ will be successively set to produce the corrective signal q (here shown to occur on a leading edge of wave o) to shift the phase of an output wave r of the frequency halver of unit UT. Wave r, as illustrated in the corresponding graph of FIG. 4, is initially assumed to conform to square wave e but is converted to square wave d by the corrective pulse q.

Graph s shows a train of sampling pulses coinciding with the rising edges of wave g, prior to the arrival of corrective pulse q, and with the rising edges of wave f from that moment on, i.e. at the instants $t_0$ indicated in FIG. 3.

The provision of two comparison circuits, i.e. flip-flops $FF_2$ and $FF_3$, working into coincidence gate P prevents the feedback of a corrective signal q when one such flip-flop is accidentally set by a spurious pulse inasmuch as that flip-flop will be promptly reset on the next cycle of intermediate wave h. Signal q is also applied to a resetting input of each of these flip-flops.

It will be apparent that the roles of waves d and e may be interchanged if it were desired to sample the incoming carrier wave at instants $t_x$ rather than at $t_0$, e.g. by using the trailing edges of reference waves i, k and o, p instead of their leading edges as a switching criterion. In either case, however, stage SM of phase detector RF effectively compares both the leading and the trailing edges of these reference waves with local square wave d or e to determine their relative phasing.

An interrupter IR, inserted between squarer SQ and phase detector RF in FIG. 4, may be controlled by the arrival of the first midposition pulse b' or by a code signal from the remote station, marking the end of the acquisition interval, to disconnect the XOR gate XG from the input of decoder CC. The output signal of that gate will then be identical with wave d, giving rise to two mutually complementary square waves of the same frequency $F_1$ in the outputs of flip-flop $FF_1$ so that the leading edges of one of them will invariably coincide with low levels of wave d, thereby preventing the emission of a corrective signal q from AND gate P.

I claim:

1. In a receiver for a biphase-coded carrier wave of predetermined frequency undergoing a phase reversal in the middle of each cycle thereof and also at the beginning of certain cycles according to the logical value of corresponding bits of a binary message conveyed thereby, said carrier wave being preceded by a presynchronization oscillation with alternating half-cycles each equal to a cycle of said predetermined frequency, the receiver including input means connected to a transmission line over which said presynchronization oscillation and said carrier wave arrive from a remote station, decoding means connected to said input means for sampling said carrier wave once per cycle thereof to reconstruct said binary message, and circuitry for controlling the sampling of said carrier wave in said decoding means, the improvement wherein said circuitry comprises:

differentiation means connected to said input means for deriving a spike from said presynchronization oscillation at the beginning of each of said half-cycles thereof;

timing means controlled by said differentiation means for producing a local square wave of said predetermined frequency undergoing a phase reversal at the beginning and at the midpoint of each of said half-cycles;

switching means connected to said input means and to said timing means for deriving from said local square wave a reference square wave of the frequency of said presynchronization oscillation but offset therefrom by an odd number of quarter-cycles of said predetermined frequency;

binary phase-comparison means coupled to said switching means for identifying the half-cycles of said presynchronization oscillation coinciding with leading edges of said reference square wave;

a feedback path extending from said phase-comparison means to said timing means for inverting the phases of said local square wave and of said reference square wave upon detection of a coincidence of said leading edges with predetermined half-cycles of said presynchronization oscillation; and delay means connected to said timing means for delivering said local square wave to said decoding means with a lag equal to an odd number of said quarter-cycles;

said switching means having a first output carrying said reference square wave and a second output carrying an inverted replica of said reference square wave, said phase-comparison means comprising a first comparison circuit with input connections to said timing means and to said first output for receiving said local square wave and said reference square wave, a second comparison circuit with input connections to said timing means and to said second output for receiving said local square wave and said inverted replica, and a coincidence gate connected to said first and second comparison circuits for emitting a phase-inverting signal on said feedback path only upon detecting coincidences of said predetermined half-cycles with leading edges of both said reference square wave and said inverted replica.

2. The combination defined in claim 1 wherein said first and second comparison circuits are a pair of flip-flops settable in response to said coincidences and resettable by said phase-inverting signal on said feedback path.

3. The combination defined in claim 1 or 2 wherein said switching means comprises an Exclusive-OR gate selectively connectable to said input means for receiving said presynchronization oscillation and said local square wave, a flip-flop having a data input connected to said Exclusive-OR gate, and a connection extending from said timing means to a switching input of said flip-flop, said connection carrying an ancillary square wave of twice said predetermined frequency.

* * * * *